Oct. 27, 1970 G. EBERSOHL 3,536,990

DEVICE FOR ON-LOAD SWITCHING BETWEEN TAPS OF A MULTITAP TRANSFORMER WINDING

Filed Jan. 12, 1968 5 Sheets-Sheet 1

Oct. 27, 1970 G. EBERSOHL 3,536,990

DEVICE FOR ON-LOAD SWITCHING BETWEEN TAPS OF A MULTITAP TRANSFORMER WINDING

Filed Jan. 12, 1968 5 Sheets-Sheet 5

United States Patent Office 3,536,990
Patented Oct. 27, 1970

3,536,990

DEVICE FOR ON-LOAD SWITCHING BETWEEN TAPS OF A MULTITAP TRANSFORMER WINDING

Gerard Ebersohl, Aix-les-Bains, France, assignor to Compagnie Generale d'Electricite, Paris, France, a French corporation Filed Jan. 12, 1968, Ser. No. 697,457
Claims priority, application France, Jan. 12, 1967, 90,949
Int. Cl. H02p 13/06
U.S. Cl. 323—43.5 6 Claims

ABSTRACT OF THE DISCLOSURE

Device for the on-load switching from one tap to another of a multiple-tap transformer winding by means of two load change-over switches consisting each one, of at least two thyristors connected in push-pull in parallel whose pulse-operated control is under the dependence of a device detecting the zero point of the load current wherein the detecting device provides one output when the current passes through zero in the increasing direction and another output when the current passes through zero in the decreasing direction, the respective outputs of the detecting device serving to render the presently conducting switch non-conductive and the presently non-conductive switch conductive in successive order.

Figure 1:
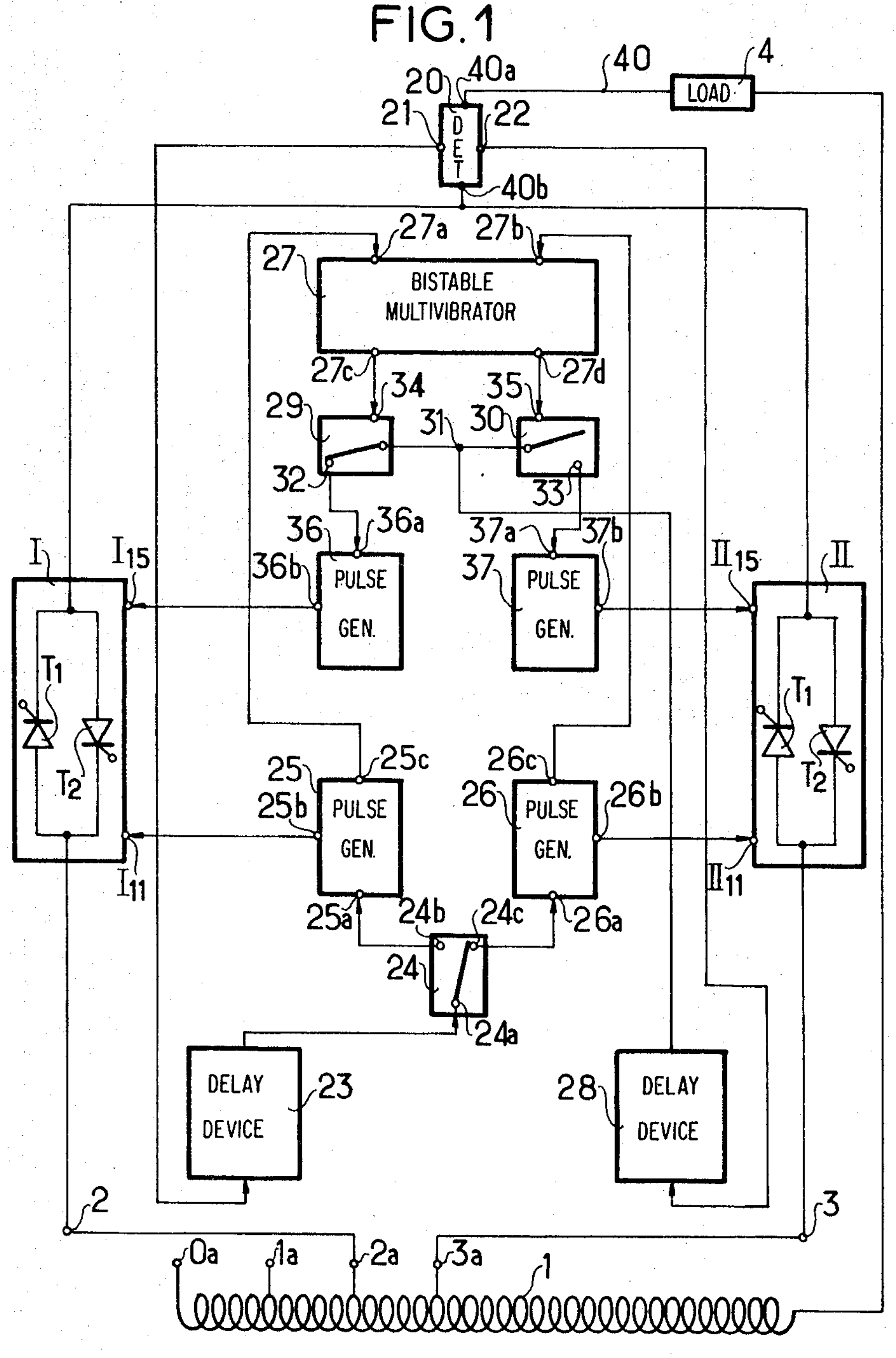

The invention relates to devices for on-load switching of two taps of a multitap transformer winding by means of two static tapchanging switches which are connected respectively to the two taps to be switched, each of which consists of at least two thyristors connected in parallel with opposite directions of conduction.

The invention has for its object to render possible a rapid switching without danger of short-circuiting between the two taps of the adjusting winding which are to be switched.

Another object of the invention is to effect the switching in the neighbourhood of the passage through zero of the alternating current to be switched, while avoiding transients which are capable of disturbing the switching operation.

Another object of the invention is to make it possible to render the switching subject to the control of a follow-up system, notably by rendering the control of the switching dependent upon the manipulation of a preselector by means of which the taps of the adjusting winding to be switched are chosen before the switching.

The on-load switching device according to the invention is characterised by the fact that the said tap-changing switches consist of at least two thyristors in parallel, each of which comprises a pulse-operated closing control input and a pulse-operated opening control input, the said switching device also comprising: a device for detecting the zero point of the load current which is in series with the load of the switching device and provides an output which emits a pulse each time the current passes through with increasing variation and an output which emits a pulse each time the current passes through with decreasing variation; a first delay device having an input connected to one of the outputs of the said device for detecting the zero point of the current and having an output which supplies a pulse a predetermined delay after receipt of each pulse at its input; a second delay device having an input connected to the other output of the said device for the detection of the zero point of the current and having an output which supplies a pulse a predetermined delay after receipt of each pulse at its input; a first control switching device which comprises an input connected to the output of the said first delay device and two outputs, and which, under the action of a manual or follow-up control, may be brought to either one of two states in which a pulse applied to its input sets up at one or the other of its outputs a pulse which acts on the opening control input of one tap-changing switch or the other, depending upon whether the switching devices has been brought to one of its two states or the other; a second control switching device which comprises an input connected to the output of the said second delay device and two outputs which act on the closing control of one tap-changing switch or the other, and which, under the action of a pulse at either one of the two outputs of the said first control switching device, is brought to either one of two states, in which a pulse at its input sets up a pulse at either one of its two outputs, so that a pulse at one of the outputs of the said device for the detection of the zero point of the load current brings about the opening of one of the load change-over switches, and in such manner that the succeeding pulse of the other output of the device for the detection of the zero point of the current brings about the closing of the load change-over.

Figure 2:
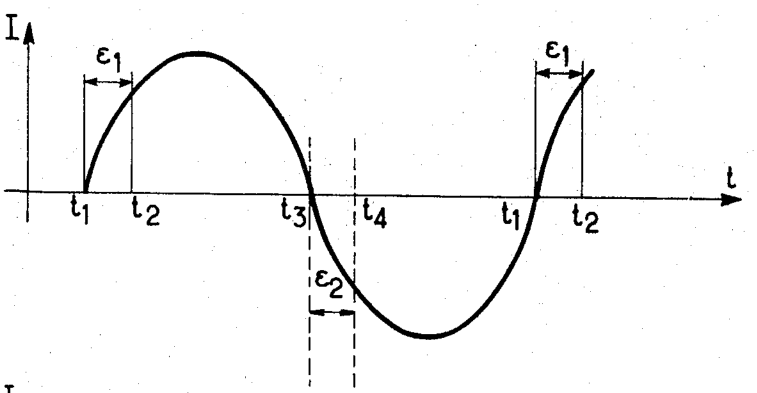
Figure 3:
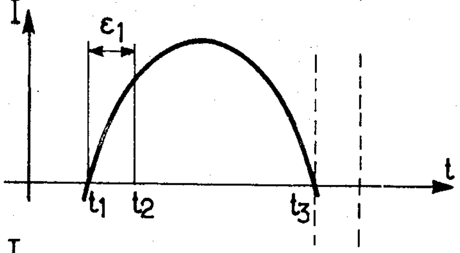
Figure 4:
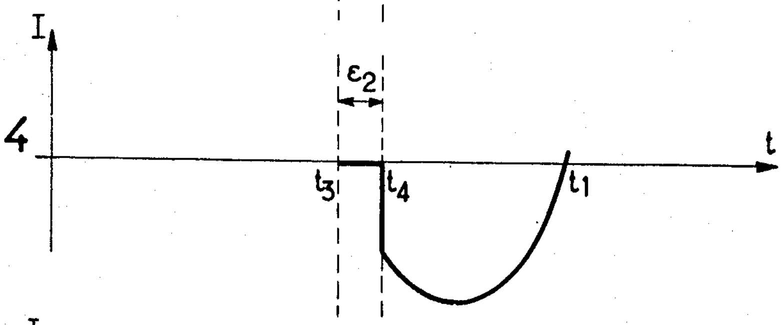
Figure 5:
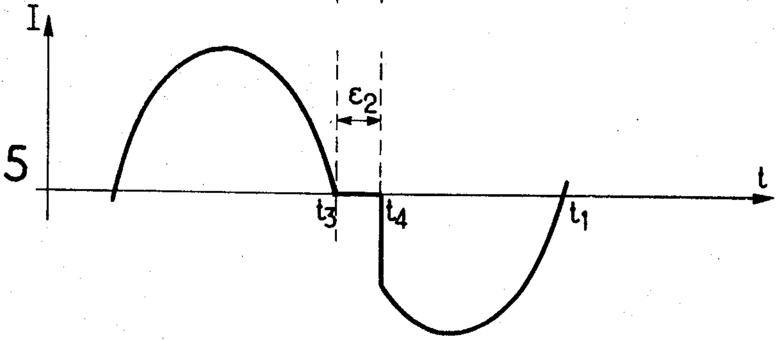
Figure 6:
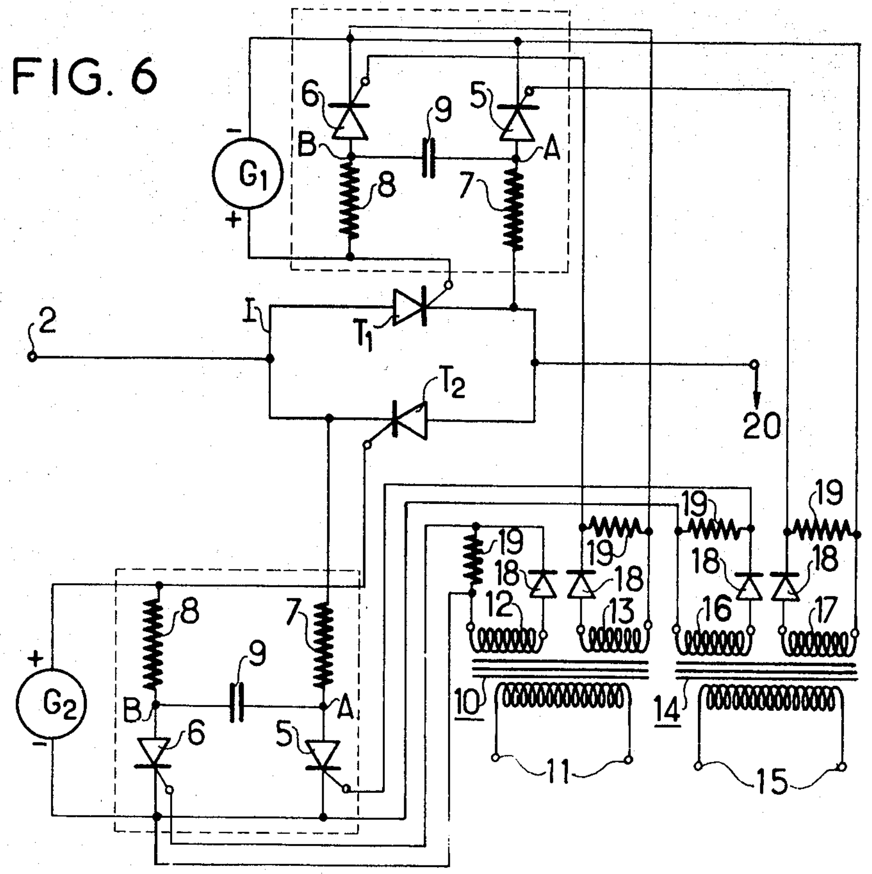
Figure 7:
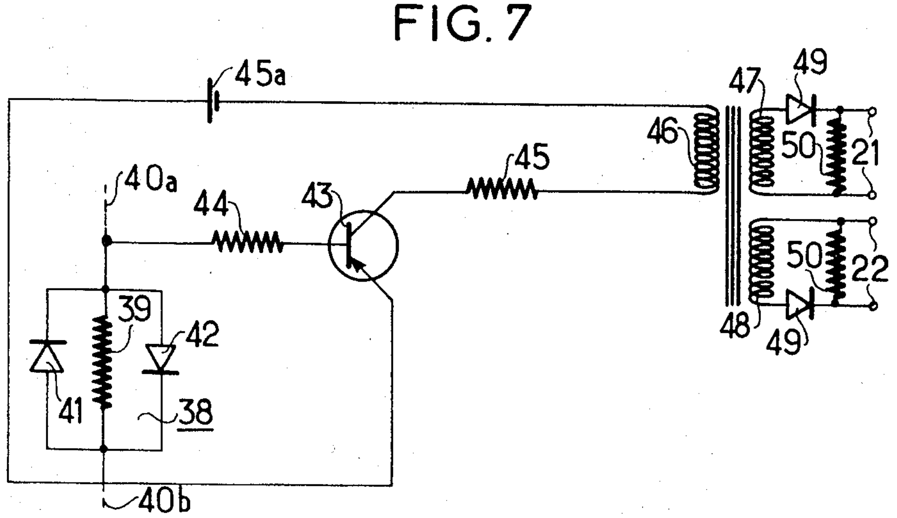
Figure 8:
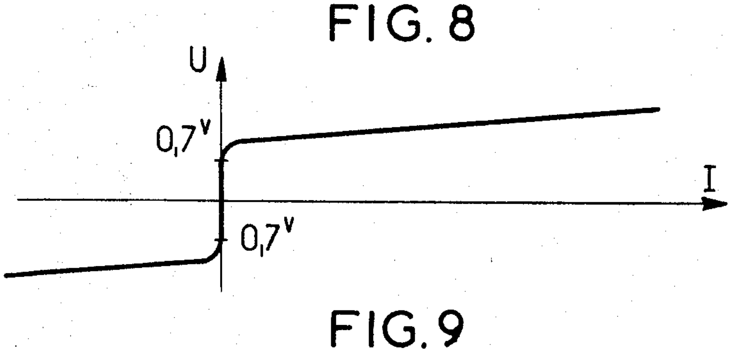
Figure 9:
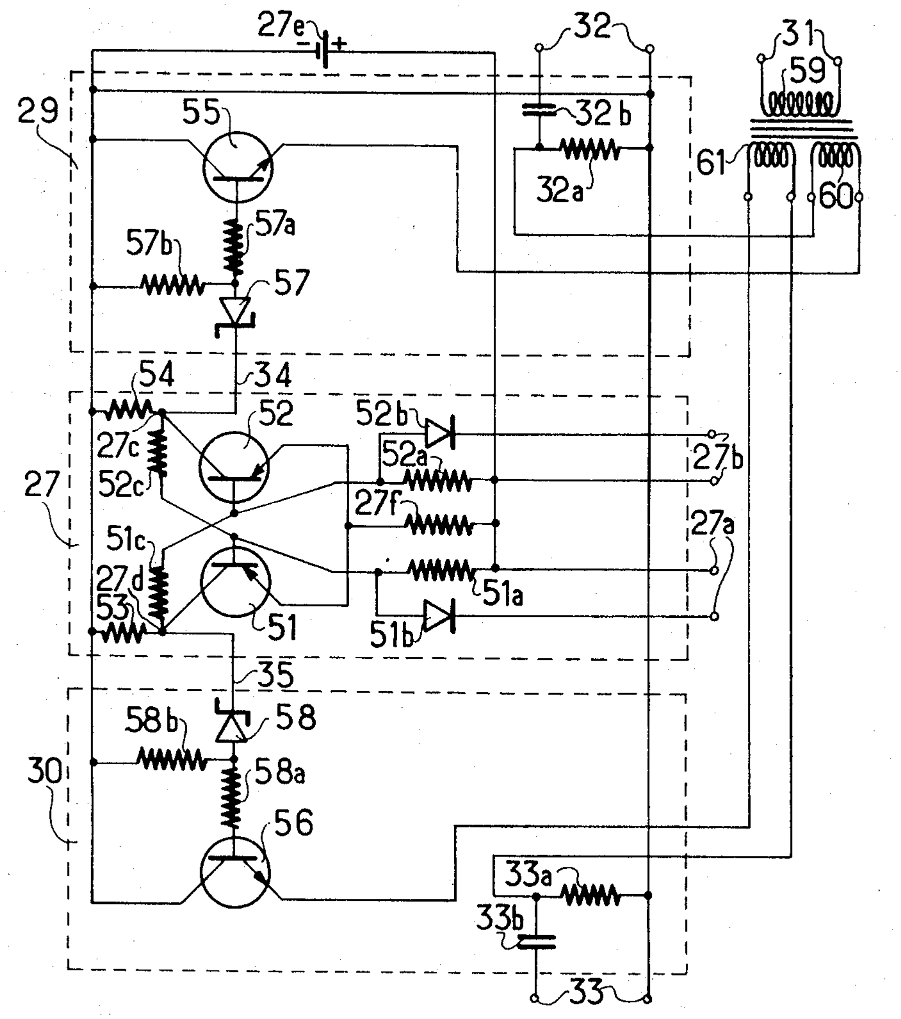
Figure 10:
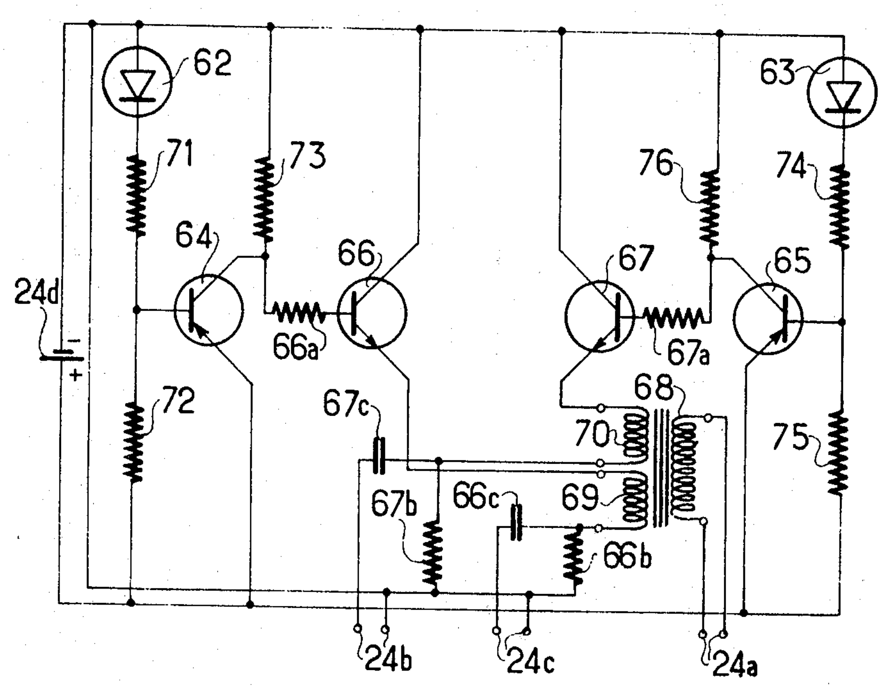
Figure 11:
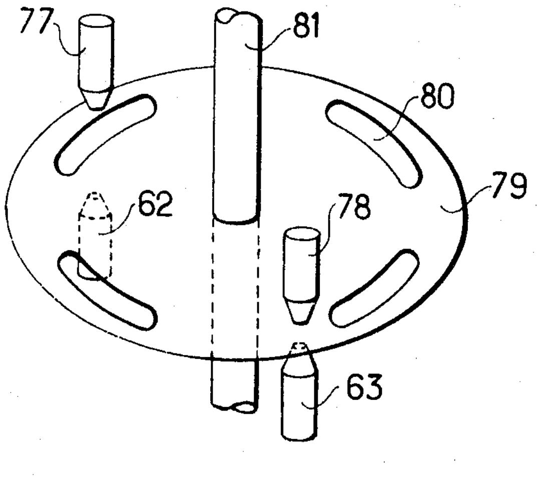

Further features of the invention wil become apparent from the following description of embodiments and from the accompanying drawings in which:

FIG. 1 is the circuit diagram of an on-load switching device and of its control circuits according to the invention, FIG. 2 is a schematic diagram of the load current before switching, FIG. 3 is a diagram of the load current passing through one of the power switches which has been opened, FIG. 4 is a diagram of the load current in the power switch which has been closed, FIG. 5 is a diagram of the current through the load in the course of a switching operation, FIG. 6 is a schematic circuit diagram of one of the power switches of FIG. 1, FIG. 7 ts a schematic circuit diagram of a device for the detection of the zero point of the load current, FIG. 8 is a diagram of the voltage across the terminals of the shunt of the detector of FIG. 7, as a function of the load current, FIG. 9 is a schematic circuit diagram of the bistable multivibrator and of the switches controlled by this multivibrator, according to FIG. 1, FIG. 10 is a schematic circuit diagram of the switch controlling the tap-changing according to FIG. 1, and FIG. 11 diagrammatically illustrates a control arrangement dependent upon the operation of a tap preselector.

The on-load switching arrangement according to FIG. 1 is intended for the adjustment of the voltage across the terminals of a load 4 which is fed by a winding 1 having multiple taps 0*a*, 1*a*, 2*a*, 3*a* . . . forming part of an adjusting transformer.

One of the terminals of the load 4 is connected directly to one end of the winding 1 and its other terminal is connected by way of a conductor 40 through a detector 20 to two tap-changing switches I and II, each of which is connected to a respective one of the two terminals 2 and 3 of the switching device, which are connected to two of the multiple taps of the winding 1 by means of a tap preselector (not shown).

Each of the tap-changing switches I and II comprises a power circuit consisting of two thyristors $T_1$ and $T_2$ connected in parallel with opposite directions of conduction, for passing the two half-cycles of the load current to be switched. These switches I and II are capable of selectively opening and closing in response to outside control thereby connecting one of the taps from the winding 1 to the load 4 via detector 20 and conductor 40. The switch I has input terminal $I_{11}$ and $I_{15}$ by which the switch may be opened and closed, respectively, in response to application of a pulse thereto. In a like manner, switch II has input terminals $II_{11}$ and $II_{15}$ by which this switch may be opened and closed, respectively, in response to application of a pulse thereto.

The control of these pulse circuits in accordance with FIG. 1 is rendered dependent upon the device 20 for detecting the zero point of the load current which is connected in series via the conductor 40 between the switches I and II and the load 4. This detector 20 provides an output at 21 at which a pulse is produced each time the load current passes through zero with variation in the increasing direction and an output 22 at which a pulse is produced each time the load current passes through zero with variation in the decreasing direction.

The output 21 of the detector 20 is connected to the input of a delay device 23 which serves to delay the pulses emitted at the output 21 of detector 20 by a delay time $\epsilon_1$. The output of the delay device 23 is connected to the input 24*a* of a device 24 performing the function of a control switch which can be brought, by a manual or follow-up control, to either one of two states in which a pulse is set up at one of two outputs 24*b* and 24*c* when a pulse is applied to its input 24*a*. This device may be an electromechanical switch or, more advantageously, a manually controlled electronic system or a follow-up system, notably one which responds to the angular position of the driving shaft of a preselector for the taps to be switched, for example through an optical device, as hereinafter described.

The output 24*b* is connected to the input 25*a* of a controlled pulse generator 25 which, as soon as it receives a pulse at this input, supplies a calibrated pulse at its output circuits 25*b* and 25*c*, which are connected to the input $I_{11}$ of the switch I and to the input 27*a* of an electronic bistable multivibrator 27, respectively.

The output 24*c* is connected to the input 26*a* of a controlled pulse generator 26, similar to the generator 25 and comprising an output 26*b* connected to the input $II_{11}$ of the switch II and an output 26*c* connected to the input 27*b* of the bistable multivibrator 27.

The bistable multivibrator 27 supplies a voltage at one of two outputs 27*c* and 27*d*, depending upon whether it is brought to one or other of its two stable states by a control pulse at one or other of its two inputs 27*a* and 27*b*.

On the other hand, the output 22 of the device for the detection of the zero passage of the load current is connected to the input of a delay device 28 which serves to delay the pulses emitted at this output of the detector by a delay time $\epsilon 2$. Two rapid electronic switches 29 and 30 have a common input 31 connected to the output of the delay device 28, and also have outputs 32 and 33, respectively, connected to a pair of controlled pulse generators 36 and 37. The switch 29 comprises a control device whose input 34 is connected to the output 27*c* of the bistable multivibrator 27, which brings the said switch into the closed condition when a pulse is applied to the input 27*b* of the multivibrator 27, and conversely brings the said switch 29 into the open condition when a pulse is applied to the input 27*a* of the multivibrator 27. Likewise, the switch 30 comprises a control device whose input 35 is connected to the output 27*d* of the bistable multivibrator to bring this switch 30 into the open condition when a pulse is applied to the input 27*b* of the multivibrator, and into the closed condition when a pulse is applied to the input 27*a* of the multivibrator. The bistable multivibrator 27 and the switches 29 and 30 associated therewith thus form a second control switching device which responds to the pulses supplied by the control switching device 24.

The controlled pulse generator 36 comprises an input 36*a* connected to the output 32 of the switch 29, and an output 36*b* connected to the input $I_{15}$ of the closing circuit of the tap-changing switch I, so as to supply a calibrated pulse to this closing circuit when a pulse is applied to the input 36*a* of the pulse generator. Similarly, the controlled pulse generator 37 comprises an input 37*a* connected to the output 33 of the switch 30, and an output 37*b* connected to the input $II_{15}$ of the closing circuit of the tap-changing switch II, so as to supply a calibrated pulse to this closing circuit when a pulse is applied to the input 37*a* of the pulse generator.

The on-load switching device described in the foregoing may be employed with any alternating current, whether sinusoidal or not. The load 4 may be resistive, inductive, or capacitive. With one of the tap changing switches I and II under load, the gate-cathode control circuits of its thyristors $T_1$ and $T_2$ remain energized without discontinuity by the current generators of the switch, without necessitating the action of pulses on the primary winding 15 of the pulse transformer 14 (FIG. 6) for closing the switch. This possibility is particularly advantageous when the device 24 performing the function of a change-over member must respond to the angular position of the operating shaft of a tap preselector. The device 24 could thus, without disadvantage, consist of a movable contact which is adapted to occupy an intermediate position between two fixed contacts. The operation would be in no way detrimentally affected by an interruption of the arrival of pulses at the primary winding of the input transformer of the switches I and II.

The operation of the system in accordance with the invention will now be described. At each instant $t_1$ of the diagram of FIG. 2, when the current passes through zero while increasing, the device 20, which is capable of detecting the zero point of the load current, emits a pulse at output 21, which pulse is applied to the input of the delay device 23.

At each instant $t_2=t_1+\epsilon_1$, as a result of the delay $\epsilon_1$ of delay device 23, the pulse from detector 20 is supplied to the input 24*a* of the device 24, which performs the function of a control change-over member. Assuming the switch I is under load, a pulse is set up at the output 24*c* of the device 24. The generator 26 triggered by the pulse at input 26*a* applies a pulse to the input $II_{11}$ of the switch II insuring the open condition of the switch II, which should already be open, so that there is no effect on the operation. Pulses from output 26*c* of pulse generator 26 are also set up at each instant $t_2$ at the input 27*b* of the bistable multivibrator 27. The voltages at outputs 27*c* and 27*d* of the multivibrator bring about the closing of the switch 29 and the opening of the switch 30.

At each instant $t_3$ when the load current passes through zero in the decreasing direction, the detector device 20, which is provided for detection of the zero point of the current, applies a pulse to the input of the delay device 28. At each instant $t_4=t_3+\epsilon_2$, as a result of the delay $\epsilon_2$ of delay device 28, the pulse from detector 20 is applied to the input 36*a* of the generator 36 through the switch 29. This generator simultaneously applies a pulse to the input $I_{15}$ of the pulse transformer ensuring the closing the switch I, which should already be closed. There is again no effect on the operation.

The switching between taps takes place as follows:

The power switch I being under load, the device 24 performing the function of a control switch is brought by its manual or follow-up operation to the conditions wherein the contacts 24*a* and 24*b* are connected so that there is provided at its output 24*b* a pulse at each of the instants $t_2=t_1+\epsilon_1$. This control of the device 24 may be effected at any instant, either during a positive half-cycle or during a negative half-cycle of the load current. When the control is effected before an instant $t_3$ but after instant $t_1$, the first pulse at the output 22 of the detector 20 has no effect, since the condition of the switch 29 remains unchanged. However, the first pulse of the detector 20 at its output 21 at an instant $t_1$ sets up a pulse at the instant $t_2=t_1+\epsilon_1$ at the input 25*a* of the pulse generator 25. A pulse is simultaneously applied to the input $I_{11}$ of the circuit controlling the opening of the tap-changing switch I and to the input 27*a* of the bistable multivibrator 27. The thyristor $T_1$ is conductive at the instant $t_1+\epsilon_1$. The delay $\epsilon_1$, which may be of the order of 1 ms. in the case of a 50 c./s. alternating current, is so chosen that the conduction of the thyristor $T_1$ is then fully established. The current generators of the thyristors of the switch I cease to feed the gate-cathode circuits of the thyristors, but the thyristor $T_1$ remains conductive unconditionally until the end of the positive half-cycle, as illustrated in the diagram of FIG. 3, because after 1 ms. the current passing through the thyristor $T_1$ is very much greater than the minimum current for maintaining the conduction of this thyristor. At the instant $t_3$ when the current again passes through zero, the thyristor $T_1$ is subjected to a negative anode-cathode voltage which renders it nonconductive.

The pulse at the input 27*a* of the bistable multivibrator 27 simultaneously brings the switch 30 into the closed condition and the switch 29 into the open condition. The pulse which is set up at the output 22 of the detector 20 at the instant $t_3$ is delayed by a time $\epsilon_2$ in delay device 28 and is then applied to the input 37*a* of the generator 37 at the instant $t_4=t_3+\epsilon_2$. The pulse simultaneously passes through switch 30 to the input $II_{15}$ of the closing control circuit of the tap-changing switch II. The latter therefore carries the load current from the instant $t_4=t_3+\epsilon_2$, as illustrated in the diagram of FIG. 4.

As soon as the tap-changing switch II is brought into the conductive state at the instant $t_4$, the tap-changing switch I is suddenly subjected to the step voltage $U_e$ exising between the taps 2 and 3 of the switches I and II. A study of the relative phases between the voltage $U_e$ and the changed-over current having different power factor values shows that in some cases the voltage $U_e$ applied to the terminals of the switch I may be positive at the instant when the switch II is closed. It is therefore necessary for the thyristor $T_1$ of the switch I, which has just been conducting, to have returned to an unconditional non-conductive state. This is effected by delaying the closing of the switch II with a delay $\epsilon_2$ which may be of the order of 150 $\mu$s. The load current, however, only undergoes a negligible interruption, as is shown by the diagram of FIG. 5.

The arrangement described in the foregoing with reference to FIG. 1 may be constructed with elements usually employed to obtain the indicated functions. However, examples of elements which may be utilized in the system of FIG. 1 will be described in connection with FIGS. 6 through 11.

As is illustrated in FIG. 6, each of the thyristors $T_1$ and $T_2$ comprises a gate-cathode control circuit connected to a direct-current generator $G_i(i=1, 2 \ldots)$ which is separate for each thyristor, with the interposition of an auxiliary low-power rapid electronic switch whose open and closed conditions are controlled by a pulse at one or the other of the two input circuits 11 and 15. This auxiliary switch may consist of a bistable multivibrator comprising transistors or advantageously thyristors, as in the example of FIG. 6.

The direct-current generators $G_i$ of the thyristors $T_1$ and $T_2$ of the tap-changing switch I are only symbolically illustrated in FIG. 6. They may consist notably of an auxiliary low-power transformer which feeds a rectifier circuit with, if required, a cell for filtering the alternating component of the rectified current. The positive pole of the generator $G_i$ of each of the thyristors $T_1$ and $T_2$ is directly connected to the gate electrode of the thyristor and the negative pole of the generator is connected to the cathode of the thyristor through an auxiliary switch comprising a bistable multivibrator. The latter comprises two low-power thyristors 5 and 6, the cathode of which is connected to the negative pole of the generator G. The anode of the thyristor 5 is connected through a resistor 7 to the cathode of the power thyristor $T_1$ or $T_2$. The anode of the thyristor 6 is connected to the positive pole of the generator G through a resistor 8. A capacitor 9 is connected to the common point between the thyristor 5 and the resistor 7 and to the common point between the thyristor 6 and the resistor 8.

Each of the tap-changing switches I and II comprises a pulse transformer 10 for bringing the switch into the open condition and a pulse transformer 14 for bringing the switch into the closed condition. The pulse transformer 10 comprises a primary winding 11 and two secondary windings 12 and 13 which are connected to the gate-cathode circuits of the thyristors 6 of the two auxiliary switches. The pulse transformer 14 comprises a primary winding 15 and two secondary windings 16 and 17 which are connected to the gate-cathode circuits of the thyristors 5 of the two auxiliary switches. On the other hand, a rectifying diode 18 is in series in the circuit of each of the secondary windings so as to allow the passage only of pulses of the polarity of the gate-cathode circuits to be controlled.

A resistor 19 is connected in shunt to the terminals of each of the gate-cathode circuits in order to fix the potential of the gate electrode when the diode 18 of its circuit is non-conductive. The gate-cathode circuits of each of the thyristors $T_1$ and $T_2$ are continuously energized by the current generators $G_1$ and $G_2$ when the power switch is in the closed condition. The thyristors 5 of the auxiliary switches are maintained conductive by the current of the generators G which continuously feed the thyristors 5. The thyristors 6 are then non-conductive. The common points A between the thyristors 5 and the resistor 7 are at a substantially zero potential in relation to the negative poles of the generators $G_1$ and $G_2$.

On the other hand, the common points B between the thyristors 6 and the resistors 8 are at the potential of the positive poles of the generators G. The voltage $V_{AB}$ across the terminals of the capacitors 9 is therefore negative. When the pulse transformer 10 supplies a pulse to the gate-cathode circuits of the thyristors 6, the latter become conductive and the positive voltages of the points B are applied to the cathodes of the thyristors 5, which are thus rendered non-conductive. The potentials of the points B become zero, while the points A are brought to the potential of the positive poles of the generators. The inverse process may therefore occur when the pulse transformer 14 supplies pulses to the gate-cathode circuits of the thyristors 5, thus rendering them conductive.

The tap-changing switches I and II illustrated in FIG. 1 are constructed as already described, but only the inputs of the primary windings of the pulse transformers 10 and 14 are shown at $I_{11}$ and $II_{11}$ and at $I_{15}$ and $II_{15}$ in FIG. 1.

The device 20 for the detection of the zero point of the load current must be able to operate with currents whose law of variation as a function of time is complex. The value of the current must be able to fall to a few amperes even if the nominal value is of several hundred amperes. The precision of the detection must be at least from 15 to 20 $\mu$s for a 50 c./s. alternating current.

These results may be obtained with advantage by a zero point detector according to FIG. 7. This detector comprises a shunt circuit 38 connected in series in the section 40*a*, 40*b* of the conductor 40 (FIG. 1) connecting the load 4 to the tap-changing switches I and I. The voltage across the terminals of the shunt is amplified by means of a class-B amplifier operating in saturation in order that the amplified voltage may form a succession of square waves having steep edges, each of which corresponds to a zero point of the load current. The wave edges representing increasing current variation correspond to the instants $t_1$ of the diagram of FIG. 2, and the wave edges representing decreasing current variation correspond to the instant $t_3$. It is therefore sufficient to add a circuit to the amplifier in order to collect at the instants $t_1$ and $t_3$ pulses of opposite polarities which may be directed to separate outputs.

The shunt circuit 38 must set up to the nominal current a resistance which is only sufficiently low to limit the dissipated energy to an acceptable value. The voltage drop available across the terminals of the shunt may then be of several hundred mv., but if the shunt resistance is linear, the voltage available across its terminals will be of the order of several mv. for currents of a few amperes, which necessitates the use of an electronic amplifier having a very high gain in order to obtain its saturation. Now, such an amplifier is likely to be much too sensitive to the stray currents existing in the neighbourhood of the transformer, notably the stray currents due to magnetic fields or to electric fields.

In order to avoid this disadvantage, the shunt circuit 38 consists of two silicon power diodes 41 and 42 connected in parallel with opposite directions of conduction. As is shown by the diagram of FIG. 8, the voltage drop U between the terminals of such a non-linear shunt very rapidly reaches a value which may be of the order of 700 mv. as soon as the shunt is traversed by a current I, no matter how weak.

The terminals of the shunt circuit 38 are connected to the input terminals of the emitter-base circuit of a transistor 43, in which a resistor 44 limits the base current to an acceptable value. A resistor 39 connected in shunt to the terminals of the shunt circuit 38 brings the base of the transistor to earth potential when it is at rest, but its value, which may be of the order of several thousand ohms, is sufficiently high to avoid modifying the voltage drop between the terminals of the shunt.

A load resistor 45 in series in the emitter-collector circuit has a value which is only moderately high, in order that the device may operate at relatively high temperatures with, however, a low potential shift of the collector when the input signal is zero. The load resistor 45 is connected in series with a battery **45*a*, symbolically representing the supply source, and with the primary winding 46 of an output transformer, which has two secondary windings 47 and 48. A rectifying diode 49 is connected in series in the circuit of each of the said secondary windings and a resistor 50** is connected in shunt with the output terminals of each secondary winding.

The inductance L of the primary winding 46 is so chosen that the ratio $L/R$ between this inductance and the resistance R of the load of the transistor is low. This circuit R, L then behaves as an extraction circuit. The amplifier thus constituted operates as a class B amplifier with an on-off action. The transistor 43 is preferably a germanium transistor in order that it may have a threshold input voltage below that of a silicon transistor.

The instants $t_1$ when the current through the shunt is cancelled out with increasing variation are immediately followed by a saturation of the emitter-base circuit of the transistor 43. The curernt through the primary winding 46 of the output transformer increases with a steep edge, thereby inducing in the secondary winding 47 a pulse whose polarity corresponds to that of the diode 49 of the said secondary winding. The said pulse therefore reaches the output terminals 21 of the detector.

At the instant $t_2$ when the current through the shunt passes through zero with decreasing variation, the voltage drop across the terminals of the shunt becomes zero, and is thereafter immediately reversed, thus bringing about a rapid desaturation of the emitter-base circuit of the transistor 43. The current through the primary winding 46 of the output transformer becomes zero with a steep edge. A pulse of opposite polarity to those occurring at the instants $t_1$ is induced in the secondary windings 47 and 48. Only the diode 49 in the circuit of the secondary winding 48 allows the passage of the induced pulse which is applied to the output terminals 22 of the detector.

Of course, the amplifier of this device is only referred to by way of example. It is possible to improve the performances of the detector, notably by amplifying the signal at the terminals of the shunt by means of a direct-current amplifier having a moderate gain before it is clipped and extracted.

The delay devices 23 and 28 may consist of delay lines having localised constants, for example, magnetostrictive lines, etc. There may be employed with advantage a blocked oscillator which supplies at its output terminals a square-wave signal followed by a brief pulse of opposite polarity. The duration of the square-wave signal may be determined with precision by the characteristic elements of the oscillator. Such a signal is obtained each time a pulse of appropriate polarity, but of any duration, is applied to the input terminals of the oscillator. A delay device is obtained by connecting in series in the output circuit a diode having a direction of conduction such that this diode eliminates the square-wave signal, but it allows the passage of the pulse of opposite polarity which is set up with a completely determined delay.

FIG. 9 illustrates the details of a form of construction of the bistable multivibrator 27 and of the switches 29 and 30 controlled by the said multivibrator. The bistable multivibrator 27 illustrated in this figure is a conventional multivibrator comprising two PNP transistors 51 and 52, the conduction of the emitter-collector circuit of one of which renders the other non-conductive. The conduction of the transistor 51 is controlled by a negative pulse at the input **27*a* of its emitter-base circuit. The conduction of the transistor 52 is controlled by a negative pulse at the input 27*b* of its emitter-base circuit. The output 27*d* of the multivibrator is connected to the terminals of a load resistor 53 provided in the emitter-collector circuit, of the transistor 51 and connected in series with the resistors 52*c* and 51*a*. A battery element 27*e* symbolically represents the feed of the multivibrator 27 and of the switches 29 and 39**.

A pulse at the input **27*a* at the terminals of the resistor 51*a* through the diode 51*b* therefore has the effect of setting up a voltage at the output 27*d*. Likewise, a pulse at the input 27*b* at the terminals of the resistor 52*a* through the diode 52*b* has the effect of setting up a voltage at the output 27*c*. The resistor 27*f* is the resistance common to the emitters of the transistors 51 and 52**.

The switches 29 and 30 consist of two NPN-type switching transistors 55 and 56 respectively of reversed connection. The control input 34 of the switch 29, which is connected to the output **27*c* of the multivibrator, is connected to the base-collector circuit of the transistor 55 through a Zener diode 57 in series with the resistor 57*a*. Likewise, the control input 35 of the switch 30 which is connected to the output 27*d* of the multivibrator is connected to the base-collector circuit of the transistor 56 through a Zener diode 58 in series with the resistor 58*a* and in parallel with the resistor 58*b***.

When a transistor 51 or 52 of the multibrator is non-conductive, the voltage across the terminals of its load resistor is low. The voltage at the control input of the corresponding switch is then lower than the avalanche voltage of its Zener diode, and the switch remains in its open condition.

As soon as a transistor of the multivibrator is rendered conductive, the voltage transmitted to the control input of the corresponding switch is higher than the avalanche voltage of its Zener diode, and the switch is brought to its closed condition.

The common input 31 of the switches 29 and 30 is connected to the terminals of the primary winding 59 of a connecting transformer comprising a secondary winding 60 in the load circuit of the transistor 55 and a secondary winding 61 in the load circuit of the transistor 56, so that when a pulse is applied to the input terminals 31 the connecting transformer injects a signal into the circuits of the transistors 55, and 56. A pulse across the terminals of the resistor **32*a* is then set up at the output 32 through the capacitor 32*b* or across the terminals of the resistor 33*a* at the output 33** through the capacitor 33*b*, depending upon whether the switching transistors 55 and 56 are open or closed.

In FIG. 1, the change-over member 24 controlling the switching is the only one which has be operated in order to bring about the opening of one of the tap-changing switches I and II and the synchronous closing of the other. Since it is operated under the control of the tap preselector, a reliable and rapid operation in synchronism with the movement of the preselector is necessitated. This may be effected, for example by means of magnetically controlled contacts in sealed tubes, or, more advantageously, by an electronic device.

FIG. 10 illustrates an advantageous form of construction of this device, which consists essentially of two photo-diodes 62 and 63 and of two optical devices 77 and 78 which, as illustrated in FIG. 11, produce two light beams directed on to the said photo-diodes through a rotative mask 79 in the form of a disc formed with openings 80 separated by imperforate portions in order that the photo-diodes may be alternately illuminated and shaded when the disc 79 is angularly moved.

The disc 79 is keyed on a shaft 81 driven by the control shaft of a preselector for the taps of the winding, which may be of any type, employed to connect electrically that one of the switches which is in the open condition to that one of the taps of the winding to which the load is to be switched.

The openings 80 in the disc 79 are situated in sectors of the disc which have an angular opening such that one of the diodes is illuminated while the other is shaded, when the preselector is brought into the position in which that tap to which the load is to be switched is placed in circuit. As is known, the inverse resistance of a photo-diode suddenly decreases when it is illuminated after having been shaded and this property is utilized in the arrangement according to FIG. 10.

The anode of the photo-diode 62 is connected to the negative pole of the source of supply of the device, the said source being symbolically represented by the battery 24*d*. This photo-diode forms with a resistor 71 in series therewith one of the arms of a voltage divider, the other arm of which consists of a resistor 72 connected to the positive supply line of the device. The common point between the resistors 71 and 72 is connected to the base of a transistor 64 of PNP type, which has a load resistor 73, one end of which is connected to the negative pole of the supply source, while the other end thereof is connected on the one hand to the collector of the transistor 64 and on the other hand through a current-limiting resistor 66*a* to the base of the NPN-type transistor 66 of reversed connection.

The resistance set up by the photo-diode 62 is very high when it is masked. The common point between the resistors 71 and 72 is substantially at the potential of the positive supply line. The transistor 64 is thus nonconductive, as also is the transistor 66. When the photo-diode 62 is suddenly illuminated, its inverse resistance decreases. The base of the transistor 64 is brought to a negative potential, and this transistor is thus rendered conductive. That end of the resistor 73 which is connected to the base of the switching transistor 66 becomes positive in relation to the collector of the said transistor, whereby the switch is closed.

The anode of the photo-diode 63 is likewise connected to the negative pole of the supply source and its cathode is connected to the positive supply line through two series resistors 74 and 75, the common point of which is connected to the base of a transistor 65 of the NPN type which has a load resistor 76 connected through the resistor 67*a* to the base of an NPN-type switching transistor 67 of reversed connection. This likewise has the result that the illumination of the photo-diode 63 brings about the closing of the switching transistor 67.

As in the previous arrangement, the input 24*a* of this switching device is connected to the primary winding 68 of a connecting transformer comprising a secondary winding 69 in the load circuit of the switching transistor 66 and a secondary winding 70 in the load circuit of the switching transistor 67. When a pulse is applied to the input 24*a*, the connecting transformer injects a signal into the circuits of the switching transistors to form a pulse at the terminals of one of the resistors 66*b* and 67*b*, which pulse appears through one of the capacitors 66*c* and 67*c* at the corresponding output 24*b* or 24*c*, depending upon whether the switching transistors are open or closed.

I have shown and described one embodiment in accordance with the present invention. It is understood that the same is not limited thereto but is susceptible of numerous changes and modifications as known to a person skilled in the art and I, therefore, do not wish to be limited to the details shown and described herein, but intend to cover all such changes and modifications as are encompassed by the scope of the appended claims.

What is claimed is:

1. Systems for the on-load switching of a load between taps of a multiple-tap transformer winding comprising:

two circuit breakers, each comprising at least two thyristors in parallel with opposite directions of conduction, a first input connected to a pulse-operated closing control means for rendering the circuit breaker conductive and a second input connected to a pulse-operated opening control means for rendering the circuit breaker non-conductive;

a zero current detector connected to said load in series with each of said circuit breakers to a respective tap of said multiple-tap transformer winding for detecting the passage of the current through zero comprising a first output emitting a pulse at each zero passage of the current with increasing variation, and a second output emitting a pulse at each zero passage of the current with decreasing variation;

a first delay element having an input connected to one of the outputs of said zero current detector and an output furnishing a pulse with delay after each pulse on the input thereof;

a second delay element having an input connected to the other output of said zero current detector and an output furnishing a pulse with delay after each pulse on the input thereof;

first control switching means for selectively switching an input connected to the output of said first delay element to one of two outputs thereof, said two outputs being connected to the second inputs of said two circuit breakers, respectively;

second control switching means for selectively switching an input connected to the output of said second delay element to one of two outputs thereof which are connected to the first input of said two circuit breakers, respectively, for closing either one or the other circuit breaker; said second control switching means being responsive to a pulse on either one or the other of the two outputs of said first control switching means for connecting its input to one of its two outputs, whereby a pulse on one of the outputs of said zero current detector controls the opening of one of the circuit breakers by means of said first control switching means and the following pulse on the other output of the zero current detector controls the closure of the other circuit breaker by means of said second control switching means.

2. Switching device according to claim 1, wherein said second control switching means comprises a bistable flip-flop providing either one or the other of two stable conditions in response to receipt of a pulse on one or the other of two inputs in dependence upon the pulses produced on one or the other of the two outputs of said first control switching means, said bistable flip-flop comprising two outputs either one or the other of which supplies a control voltage depending upon the condition of the flip-flop, said two outputs of the flip-flop controlling respectively the closing or the opening of two switches depending upon whether or not the output of the flip-flop supplies a voltage, said two switches having a common input connected to the output of the second delay element and each having one output connected to the respective first inputs of the circuit breakers for closing either one or the other of said circuit breakers.

3. Switching device according to claim 2, wherein, said two outputs of said first control switching means are connected respectively to the control inputs of two generators of controlled pulses each having two outputs, one of which is connected to said second input of a respective one of the circuit breakers and the other one of which is connected to one of the inputs of said bistable flip-flop, whereas the two inputs of the second control switching means are connected respectively to the control inputs of two other generators of controlled pulses whose outputs are connected respectively to said first control inputs of said two circuit breakers.

4. System as defined in claim 1 wherein said zero current detector comprises a shunt circuit connected in series with the load including two parallel connected power diodes having opposite directions of conductivity, an amplifier having on-off class B operation in the saturated state and an input connected to said shunt circuit, said amplifier having an output transformer with two secondary windings each connected in series with a rectifying diode so as to provide outputs during different zero crossings of the load current.

5. System as defined in claim 1 wherein said first control switch means includes a pair of switching transistors each controlled by a respective one of a pair of photo-diodes, a light source and a rotatable mask positioned between said photo-diodes and said light source and having regularly spaced openings therein so as to effect alternate illumination of said photo-diodes upon rotation of said mask.

6. System as defined in claim 5 wherein said second control switching means includes a bistable multivibrator having a first or a second output, a pair of selection switches actuated by said first and second outputs, respectively, of said multivibrator, said selection switches connected the output of said second delay element to the closing control input means of a respective circuit breaker, the binary state of said multivibrator being determined by the output of said first control switching means.

References Cited

UNITED STATES PATENTS

| | | | |
|---|---|---|---|
| 3,283,179 | 11/1966 | Carlisle et al. | 307—133 |
| 3,340,462 | 9/1967 | Ebersohl. | |
| 3,388,319 | 6/1968 | Paynter. | |
| 3,437,913 | 4/1969 | Matzl. | |

J D MILLER, Primary Examiner

G. GOLDBERG, Assistant Examiner

U.S. Cl. X.R.

307—133; 323—91; 336—150